April 21, 1925.

T. S. MILLER

CABLEWAY AND METHOD OF OPERATING THE SAME

Filed April 6, 1921      3 Sheets-Sheet 1

Thomas Spencer Miller INVENTOR.

BY

Gifford & Bull
  his ATTORNEYS

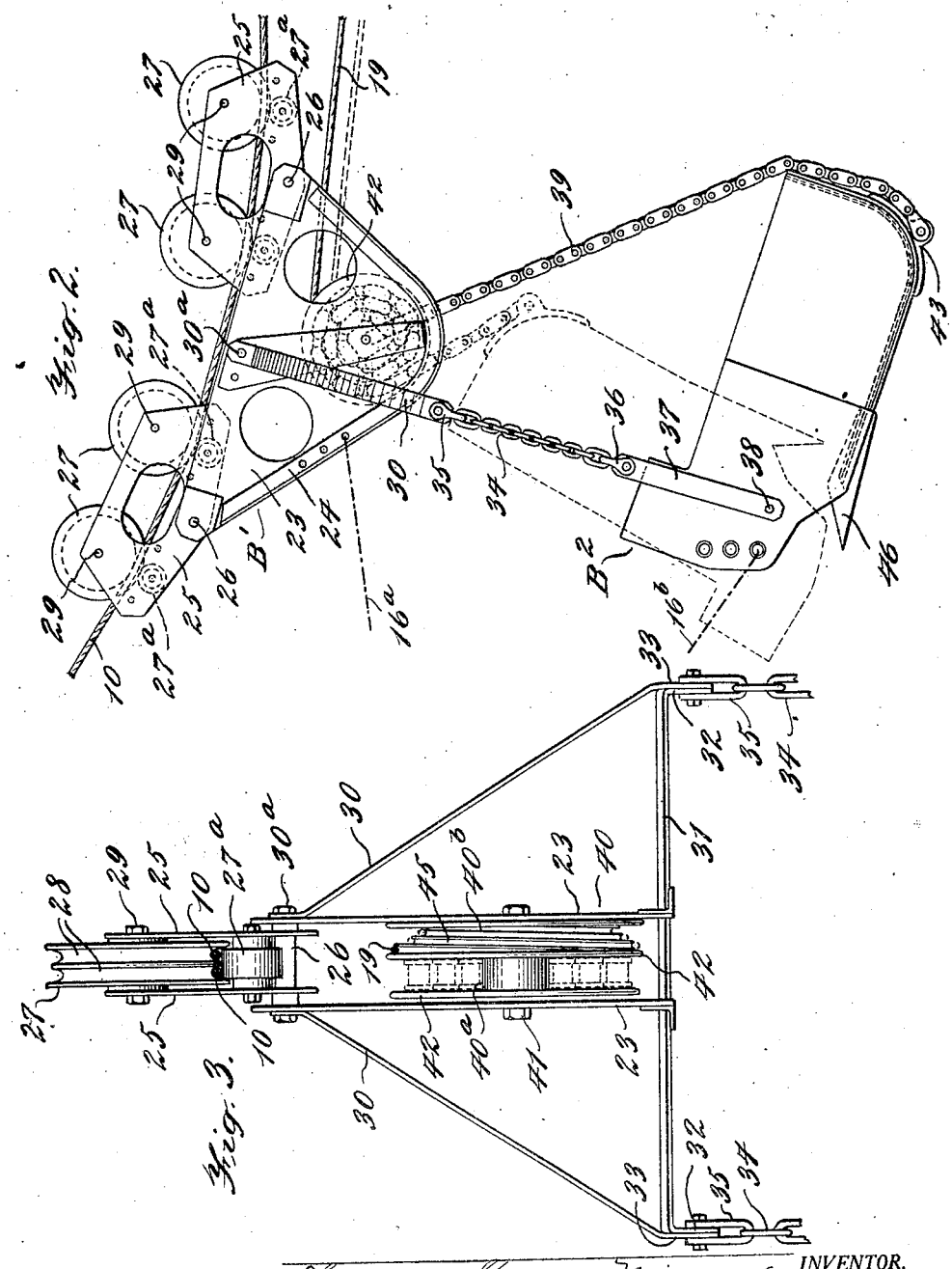

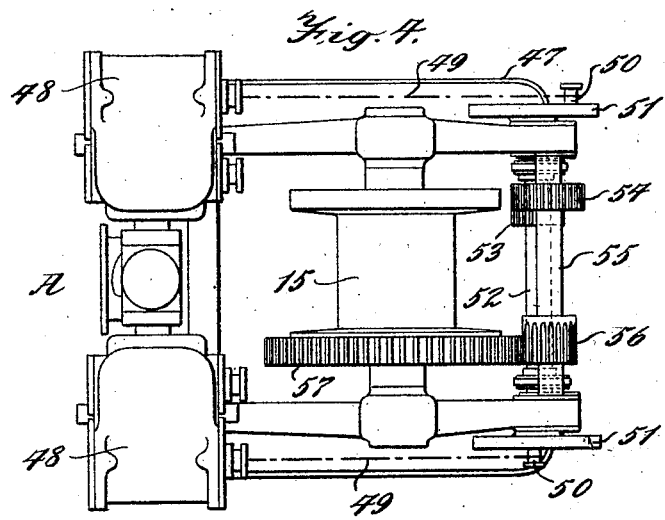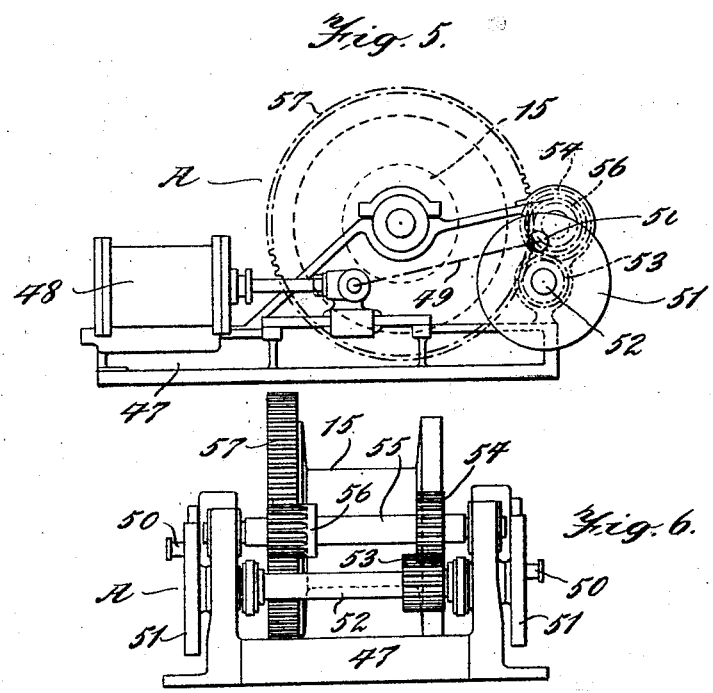

Patented Apr. 21, 1925.

1,534,185

UNITED STATES PATENT OFFICE.

THOMAS SPENCER MILLER, OF SOUTH ORANGE, NEW JERSEY.

CABLEWAY AND METHOD OF OPERATING THE SAME.

Application filed April 6, 1921. Serial No. 459,071.

*To all whom it may concern:*

Be it known that I, THOMAS SPENCER MILLER, a citizen of the United States, and a resident of South Orange, in the county of Essex and State of New Jersey, have invented certain new and useful Improvements in Cableways and Methods of Operating the Same, of which the following is a specification.

My invention more particularly relates to a method of and apparatus for operating the main supporting cable of a cableway, though it will be obvious that my invention may be applied to the operation of any load-supporting cable.

Figure 1:
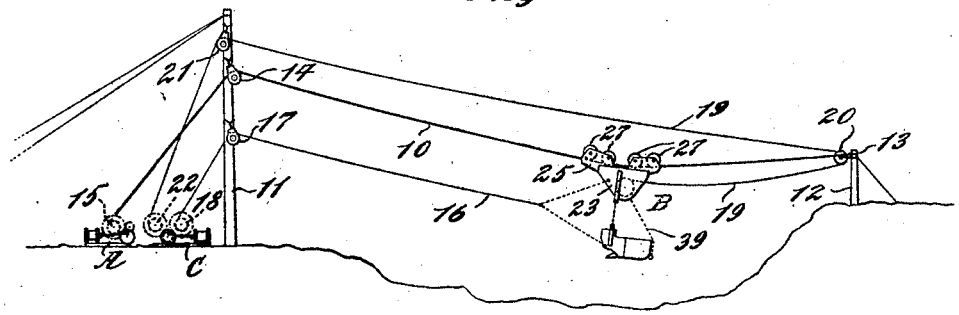
Figure 7:
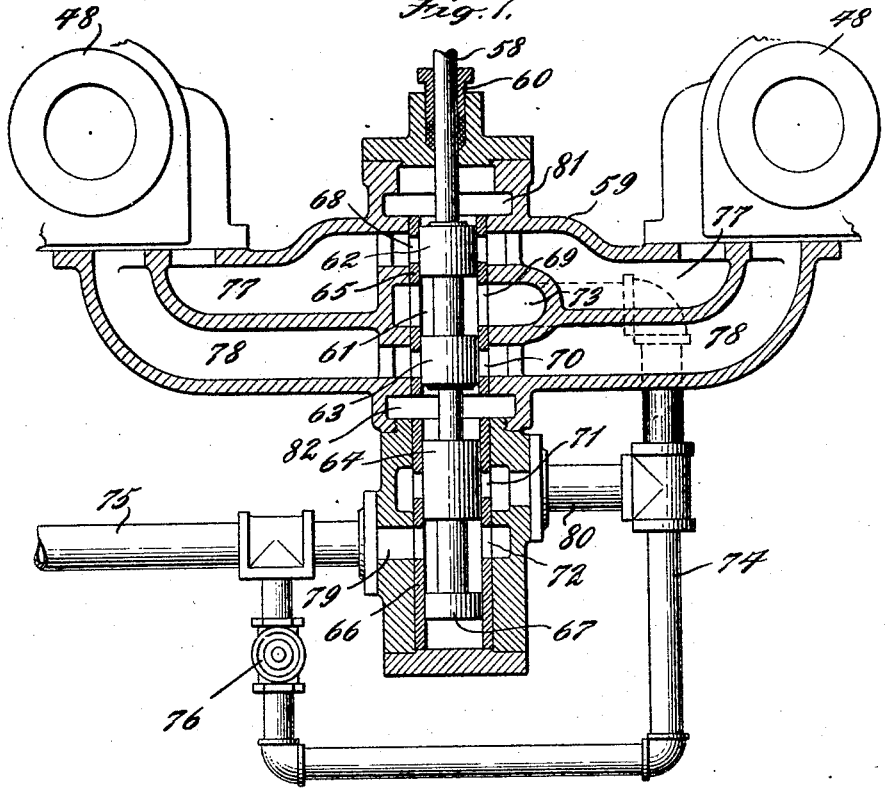

My invention will best be understood by reference to the accompanying drawings, in which I have illustrated one embodiment of my invention, and in which Figure 1 is a diagrammatic view illustrating a cableway embodying my invention; Fig. 2 is a side view of the load-carrier; Fig. 3 is an end view thereof, showing the cables in section; Fig. 4 is a plan view of a cable take-up engine made in accordance with my invention; Fig. 5 is a side view of the engine shown in Fig. 4; Fig. 6 is an end view thereof, and Fig. 7 is a sectional view showing the valve-casing for the cable take-up engine and the parts associated therewith, the cylinders for the engine being shown in elevation.

Like reference characters indicate like parts throughout the drawings.

Referring, now, to the drawings, 10 is a load-supporting cable or cables suspended between a main tower or support 11 and a tail tower or support 12, the load-carrier, which I have indicated, in general at B, being adapted to traverse the main cable. In accordance with my invention, means are provided for varying the elevation of this cable between the supports from which it is suspended, so that by raising and lowering the cable the elevation of the load-carrier may be adjusted to cause the same to approach or rest on the ground or other surface, and by elevation of the main cable, be lifted for transportation clear of the ground or other obstructions. Various means may be employed for varying the elevation of the main supporting cable, but a preferable means consists in attaching one end of the main cable to the tail tower or support, as at 13, and passing the other end of the cable over a sheave 14 attached to the main tower and winding the end of the cable onto a drum 15 operated by the main cable take-up engine, which I have indicated, in general, at A. The load-carrier may be and preferably is moved in one direction by an inhaul cable 16, one end of which is attached, by the branches $16^a$ and $16^b$, to the load-carrier, as indicated in Figs. 1 and 2, the opposite end passing over a sheave 17 secured to the main tower 11 and wound upon a drum 18 of a digging engine, which I have indicated, in general, at C. The load-carrier is moved in the opposite direction by an outhaul cable 19, one end of which is attached to the load-carrier, as indicated, in a general way, in Fig. 1, the outhaul cable passing over a sheave 20 attached to the tail tower 12 and a sheave 21 secured to the head tower 11, the end of the cable being wound upon a drum 22 of the engine C.

I have illustrated, in Figs. 2 and 3, the preferred form of load-carrier, comprising, in the form here shown, a carriage B' provided with a frame, preferably including two vertical spaced plates 23 provided at their edges with ribbed strengthening flanges 24. The frame is preferably formed substantially triangular in shape, as indicated, and at the upper angles of the frame are preferably provided auxiliary supporting frames comprising spaced plates 25 pivoted to the main plates 23, as at 26, and carrying the running wheels 27, which are preferably arranged in tandem, as shown. When two main supporting cables 10 are provided, as illustrated in the drawings, then the running wheels 27 are provided with two grooves 28 engaging the respective cables 10, the running wheels being journalled on pins mounted in the plates 25, as at 29. Suitable retaining rollers $27^a$ are also preferably provided immediately beneath the wheels 27 and having their bearings in the plates 25, as shown, for the purpose of retaining the running wheels in engagement with the main cables. Supporting means for supporting the load-carrier proper, or bucket $B^2$, from the carriage preferably comprises bars 30 secured at their upper ends, as at $30^a$, to the plates 23, and outwardly and downwardly inclined, as indicated in Fig. 3, the lower ends of the bars 30 being spaced apart by a strut 31, the ends of which are turned downwardly, as at 32, so as to engage the downwardly-turned ends 33 of the bars 30, as best shown in Fig. 3, the ends 32 and 33 being secured together in any desired manner. To the lower ends of the flanges 32 and 33 are connected chains 34 for supporting the front end of the bucket, the chains preferably being shackled to the lower ends of the bars, as at 35. The lower ends of the chains are, in turn, connected, as by shackles 36, to the upper ends of supporting bars or arms 37, which are pivoted, as at 38, to the front end of the bucket (only one of the bars 37 being shown in Fig. 2). The rear end of the bucket B² is preferably supported by means of a chain 39, the upper end of which is attached to a differential drum 40 having its bearings at 41 in the spaced plates 23, the drum having two winding portions, one portion 40ª for said chain leading to the bucket and the other 40ᵇ for the outhaul cable. The portion 40ª is provided with flanges 42, preferably spaced apart just sufficiently to accommodate the chain 39, so that when the chain is wound upon its portion of the drum, it will assume a spiral form (for a purpose which will presently be explained), as indicated in dotted lines in Fig. 2. The lower end of the chain is attached to the rear end of the bucket, preferably by means of a bracket 43, which is preferably secured to the bucket at the lowermost rear portion. In accordance with my invention, the outhaul cable 19 is wound upon the portion 40ᵇ of the drum 40, which portion is preferably provided with a spiral groove 45 of varying diameter, as indicated in Fig. 3, on which the end of the outhaul cable is wound, the outhaul cable preferably engaging substantially the entire groove, so that it leaves the pulley at that portion of the groove of greatest diameter when the bucket is in its lowered position, as indicated in full lines in Fig. 2. At this time, the supporting chain 39 engages the periphery of the drum on which it is wound, which is of a lesser diameter than the portion 40ᵇ, so that the chain leaves the drum at a point the minimum distance from the axis thereof. The bucket may be dumped in any desired manner, as by holding fast the inhaul cable and increasing the tension on the outhaul cable. At this time, since the outhaul cable leaves the pulley on which it is wound at a point the maximum distance from the center thereof, and since the supporting chain 39 for the rear end of the bucket engages its pulley at a point the minimum distance from the axis thereof, there will be a maximum leverage and a minimum of force will be required to be applied to the inhaul cable in order to raise the rear end of the bucket and thus dump the same. I have illustrated an open-ended bucket B², which is provided on its front end with digging teeth 46 of known construction. On the other hand, when the rear end of the bucket is to be lowered, the chain 39 leaves its drum portion 40ª at a point further from the axis than when the end of the bucket is being elevated, while the outhaul cable 19 leaves its drum portion 40ᵇ at a point nearer the axis, so that there is a maximum leverage for returning the bucket to normal position. With the described arrangement, the chain 39 is utilized for both supporting and dumping the bucket.

I will now describe the novel form of engine for operating in accordance with my invention, the main load-supporting cable. The take-up engine (see Figs. 4, 5, 6 and 7), which operates the main supporting cable and which is here shown as a compound-geared steam engine, is supported on a main frame 47 and is provided with steam cylinders 48 of usual form. The pistons (not shown) of the cylinders 48 are joined by connections 49 of known and usual form, and indicated in Fig. 4 by dotted lines, to crank-pins 50 mounted on discs 51 secured to a shaft 52 having its bearings in the frame of the engine. A pinion 53 is secured on the shaft 52 and engages a gear 54 secured to a shaft 55, to the opposite end of which is attached a pinion 56 engaging a gear 57, which may be mounted on the shaft of the drum 15 and which may be secured to said drum.

Referring, now, more particularly to Fig. 7, 58 is a valve-stem, which may be manually moved longitudinally by means of a lever (not shown in the drawings) and which is received in an elongated opening 61 in the valve-casing 59, the valve-stem passing through a gland 60 mounted in the casing. The opening is considerably larger than the valve-stem. A plurality of valve-heads 62, 63 and 64 are secured on the valve-stem, the first two heads being received in a cylindrical sleeve member 65 mounted within the opening 61, while the valve-head 64 is fitted within a sleeve 66, also mounted in said opening. The end of the valve-stem 58 is preferably provided with a cylindrical member 67, which acts as a stop. The valve-heads 62 and 63 cooperate with ports 68, 69 and 70 formed in the sleeve 65, while the valve-head 64 cooperates with ports 71 and 72 formed in the sleeve 66. The port 69 in the sleeve 65 communicates with a live-steam chamber 73, to which steam is normally supplied by a pipe 74 connected to the steam-supply pipe 75 through a reducing valve 76, so that steam is always admitted to the chamber 73 at a reduced pressure, say 50 pounds. The port 68 communicates with passages 77 which lead to the steam cylinders 48, while the ports 70 communicate with passages 78 which exhaust the steam from the cylinders 48. The steam-supply pipe 75 communicates directly with a chamber 79 formed in the valve-casing, and the port 71 is connected by a pipe 80 to the pipe 74. Chambers 81 and 82 are also provided in the valve-casing, which communicate with each other and with the atmosphere by connections (not shown).

The operation of the described cableway embodying my invention will readily be understood from the foregoing description, and is as follows: When the bucket is loaded and it is desired to elevate the main cable, the operator moves the valve-stem 58 upwardly, as viewed in Fig. 7. In this figure, the valve-stem is shown in such a position that all ports are blanked. The operator raises the valve-stem until the valve-head 64 is raised above the port opening 71 so that the valve-chamber 79 communicates with the ports 71 and the pipe 80, and steam is supplied at the pressure in the main supply pipe, say 150 pounds, to the chamber 73. With the valve-stem in the position assumed, the chamber 73 communicates with the passages 77, so that steam at 150 pounds pressure is admitted to the steam cylinders. During the operation of elevating the cable, the tension on the cable of the character commonly found in practice may be, for example, 80,000 pounds. The operator permits the engine to run until it is stalled, at which time the tension in the line may be, say, 100,000 pounds. It will, of course, be understood that the power applied by the engine must be sufficient not only to raise the loaded cable but to overcome the friction of the engine and associated parts. Now, when the cable is raised, less power is required in the engine to sustain the cable, since the friction of the engine is acting with the power applied to prevent the cable from being released. In other words, any downward movement of the cable must overcome the friction of the engine and the steam power applied. It is undesirable to maintain the full steam pressure on the engine after the cable is raised, since any increase in tension in the line, such as would result from the load being transferred from a point near one of the towers to the middle of the cable, or from the towers being moved along diverging tracks, might result in overturning the towers or in breaking the cable, inasmuch as the cable must overcome the friction of the engine in addition to overcoming the steam pressure applied. The tension necessary to overhaul engine A and pay out the cable would be greatly in excess of that required to raise the cable, and under the conditions assumed, might be as high as 300,000 pounds. In accordance with my invention, therefore, the steam pressure is reduced after the cable has been raised, in order that the steam pressure, together with the friction, and other internal resistances, may maintain substantially the maximum tension that existed when raising the cable. When the line has been raised, therefore, the operator moves his lever in such a direction as to move the stem 58 downwardly, as viewed in Fig. 7, to a position somewhat above that shown in the drawings, but to a position where the valve-head 64 blanks the port 71, so that steam from the main supply pipe, and at full pressure, is not admitted through the lower part of the valve-chamber, but steam under reduced pressure, say 50 pounds, is admitted from the supply pipe 75, through the reducing valve 76 and the pipe 74, to the steam chamber 73, and through the ports 69 and 68 to the passages 77, and thence to the cylinders. If the line tension, such as might result from a movement of the load from a point near one of the towers to the middle of the cable, or from a separation of the towers in the manner above indicated, exceeds, say, 105,000 pounds, then the engine will be automatically overhauled and no injury would result to the system. In order to lower the cable, as, for example, to a position where a digging operation is to be performed, the operator lowers the valve-stem, as viewed in Fig. 7, to reduce the port opening 68 and thus admit less and less steam to the cylinders 48, and the tension on the line is thus gradually reduced and the bucket permitted to descend to the digging position. Under some conditions, as, for example, when the bucket is to be manipulated, it may be desirable further to slacken the cable, and this may be accomplished by reversing the engine. This is done by lowering the valve-stem 58 until the stop 67 on the end thereof engages the wall at the bottom of the chamber 61. Steam under reduced pressure then is admitted to the chamber 73, and, through the ports 69 and 70, to the passages 78 and to the steam cylinders, thence to the passages 77, through the ports 68, and to the exhaust chamber 81.

What I claim and desire to secure by Letters Patent of the United States is:

1. The method of operating by a steam engine a load-supporting cable suspended from spaced supports, which consists in admitting to the engine steam pressure sufficient to overcome the friction of the engine and raise the cable, and then reducing the steam pressure to sustain the cable by engine friction and reduced steam pressure.

2. The method of operating by a steam engine a load-supporting cable suspended from spaced supports, which consists in admitting to the engine steam pressure sufficient to overcome the friction of the engine and raise the cable, then reducing the steam pressure sufficiently to maintain in the cable substantially the same tension, whereby when the cable stress is materially increased the engine will be overhauled and relieved from overstresses.

3. The method of operating by a steam engine a load-supporting cable suspended from spaced supports, which consists in admitting to the engine steam under pressure sufficient to overcome the friction of the engine and raise the cable to a predetermined cable stress, then reducing the steam pressure sufficiently to maintain in the cable substantially the same cable stress, whereby the cable may yield and be paid out to any extent necessary whenever the cable stress is slightly increased.

4. The method of operating by a steam engine a load-supporting cable suspended from spaced supports, which consists in admitting to the engine steam pressure sufficient to overcome the friction of the engine and raise the cable, reducing the steam pressure to sustain the cable and further reducing the steam pressure to lower the cable.

5. The method of operating by a steam engine a load-supporting cable suspended from spaced supports, which consists in admitting to the engine steam pressure sufficient to overcome the friction of the engine and raise the cable, reducing the steam pressure to sustain the cable, further reducing the steam pressure to lower the cable, and finally reversing the engine.

6. The method of operating by a steam engine a load-supporting cable suspended from spaced supports, which consists in admitting to the engine steam pressure sufficient to overcome the friction of the engine and raise the cable, and reducing the steam pressure and utilizing the friction of the engine to sustain the loaded cable.

7. The method of operating by a steam engine a load-supporting cable suspended from spaced supports, which consists in admitting to the engine steam pressure sufficient to overcome the friction of the engine and raise the cable, and reducing the steam sufficiently to permit the engine to be overhauled on a substantial increase in cable tension.

THOMAS SPENCER MILLER.